(12) United States Patent
Giovannelli (10) Patent No.: US 11,094,035 B2
(45) Date of Patent: Aug. 17, 2021

(54) SYSTEM AND METHOD FOR MAPPED SPLICING OF A THREE-DIMENSIONAL LOOK-UP TABLE FOR IMAGE FORMAT CONVERSION

(71) Applicant: GRASS VALLEY CANADA, Montreal (CA)

(72) Inventor: Giuseppe Giovannelli, St. Laurent (CA)

(73) Assignee: GRASS VALLEY CANADA, Montreal (CA)

(*) Notice: Subject to any disclaimer, the term of this patent is extended or adjusted under 35 U.S.C. 154(b) by 0 days.

(21) Appl. No.: 16/825,541

(22) Filed: Mar. 20, 2020

(65) Prior Publication Data

US 2020/0219227 A1 Jul. 9, 2020

Related U.S. Application Data

(63) Continuation of application No. 15/955,237, filed on Apr. 17, 2018, now Pat. No. 10,600,148.

(51) Int. Cl.
*G06T 1/60* (2006.01)
*G06T 15/00* (2011.01)

(52) U.S. Cl.
CPC .............. *G06T 1/60* (2013.01); *G06T 15/005* (2013.01); *G09G 2320/0666* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 6,771,275 B1 | 8/2004 | Cook et al. | |
| 10,242,647 B2 | 3/2019 | Chen | |
| 2005/0052466 A1* | 3/2005 | Frazer | H04N 1/6019 345/604 |
| 2010/0013851 A1 | 1/2010 | Shoup et al. | |
| 2011/0305389 A1 | 12/2011 | Maltz et al. | |
| 2012/0020551 A1* | 1/2012 | Ito | H04N 1/6019 382/162 |
| 2013/0222408 A1 | 8/2013 | Lee et al. | |
| 2014/0098387 A1 | 4/2014 | Chang | |
| 2014/0253583 A1* | 9/2014 | Vansickle | G09G 5/06 345/602 |
| 2016/0217766 A1* | 7/2016 | Peana | G09G 3/2003 |
| 2017/0061926 A1* | 3/2017 | Bhattacharjee | G09G 5/06 |
| 2017/0064334 A1 | 3/2017 | Minoo | |
| 2017/0124983 A1 | 5/2017 | Atkins et al. | |

(Continued)

*Primary Examiner* — Ryan M Gray
(74) *Attorney, Agent, or Firm* — Arent Fox LLP (57) ABSTRACT

A system and method that splices an initial 3D LUT for imaging format conversion into a plurality of smaller LUTs that can be stored in separate RAMs. During operation, the upper 5-bits serve as index values of each component of an incoming GBR pixel and are used to determine which of the smaller RAMs contain the correct index values for the pixel data. Specifically, a first index value can be derived from the incoming GBR pixel data and used to lookup all sub-cube vertices corresponding to the incoming pixel and the corresponding RAMs. After determining the correct RAMs, a predetermined algorithm for each given RAM is applied to find the normalized RAM look-up addresses and identify the correct data for the exemplary imaging format conversion process.

25 Claims, 7 Drawing Sheets

(56) References Cited

U.S. PATENT DOCUMENTS

2017/0316754 A1   11/2017  Katougi et al.
2018/0182353 A1    6/2018  Chen et al.
2018/0211370 A1*  7/2018  Chen .................. H04N 9/04519
2018/0247608 A1    8/2018  Chen
2018/0367778 A1  12/2018  Borer
2019/0172418 A1*  6/2019  Chen .................... H04N 1/6019

\* cited by examiner

SYSTEM AND METHOD FOR MAPPED SPLICING OF A THREE-DIMENSIONAL LOOK-UP TABLE FOR IMAGE FORMAT CONVERSION

CROSS REFERENCE TO RELATED APPLICATIONS

The current application is a continuation of U.S. application Ser. No. 15/955,327, filed Apr. 17, 2018, the entire contents of which are hereby incorporated by reference in its entirety.

TECHNICAL FIELD

The present disclosure relates generally to image format conversion of video data, and, more particularly, to a system and method for mapped splicing of a three-dimensional look-up table for high dynamic range applications.

BACKGROUND

Several forms of color space models exist within the television industry so as to properly represent and reproduce color in a physical device supporting a given color space model. For example, some of these models include Red, Green, Blue (RGB), YPbPr, ITU-R Recommendation BT.709, and ITU-R Recommendation BT.2020. Dynamic range is another aspect of brightness and color which has several forms including Standard Dynamic Range (SDR) and High Dynamic Range (HDR), which, in itself, is subject to various forms including, and not limited to, Perceptual Quantizer (PQ), HDR10, and Hybrid Log-Gamma (HLG). These dynamic range standards use different luminance curves.

In many instances, there is a need to convert between color space and/or dynamic range models. Implementation of color space and/or dynamic range conversions may employ direct mathematical formulae, but one existing approach uses 3-dimensional lookup tables ("3D LUTs") that are used extensively throughout the video and film industry. In certain implementations, a 3D LUT may be applied using computer software or using an FPGA (or similar digital logic device).

Ideally, for color space conversions using a hardware configuration such as an FPGA, with no limitation in resources, if one were to map a color space to another, then all that is required is a 1D LUT. The incoming pixel (or look-up index) is normally in the form of, but not limited to, RGB with 10-bit values (bits 9 down to 0) for each color component. However, using a 1D LUT would require $2^{\wedge}(10+10+10)$ or over 1 billion look-up values of 30-bits (or more for increased precision) each, which is a significant amount of electronic memory, even for a computer in today's standards.

By reducing the number of LUT elements and with interpolation on all 3 axes, a 3D LUT can be used effectively to map the incoming RGB value to a new one albeit with some precision loss. For example, a small (upper) portion of each incoming R, G, and B component value can be used as an index whereby each index is applied to one of three axes of a sub-cube that is represented by the LUT. The resulting look-up value is merely a point on the sub-cube and does not necessarily define the resulting value. Further processing requires interpolation of the look-up value using the remaining (lower) portion of the incoming R, G, and B component values. In such existing designs, a 3D LUT for color space conversion, for example, is normally 17×17×17 or 33×33×33 in size. Moreover, the data can be, for example, 16-bits of precision, which would effectively generate a total of 33×33×33×16×3 or 1,724,976 bits of information.

SUMMARY

Accordingly, what is needed is a system and method for image format conversion (e.g., color space conversion) that minimizes memory usage in an FPGA, for example. In general, to do so, the system will need to look up "8" values composing of the 16-bit R, G, and B data. For example, in one possible methodology, the lookup can be run 8 times the pixel rate, but this will not meet FPGA timing. Another methodology would be to create 8 identical LUTs that each containing the 1,724,976 bits of data, whereby each LUT is responsible in servicing one sub-cube vertex. However, this technique would absorb a significant amount of indispensable FPGA memory that could otherwise be used for other functions.

Thus, according to an exemplary aspect, a system and method is disclosed that splices an initial 3D LUT for the imaging format conversion into a plurality of smaller LUTs (e.g., 8 smaller LUTs) that can be stored in 8 separate RAMs "A" through "H". During operation, the upper 5-bits (i.e., the index values) of each component of an incoming GBR pixel are used to determine which of the smaller RAMs "A" through "H" contain the correct index values for this pixel data. More particularly, a first index value can be derived from the incoming GBR pixel data and used to lookup all 8 sub-cube vertices corresponding to the incoming pixel, and, thus the corresponding RAMs. After determining the correct RAMs, a predetermined algorithm for each given RAM is applied to find the normalized RAM look-up addresses and identify the correct data for the exemplary imaging format conversion process.

In an exemplary embodiment, a system is provided for mapped splicing of a three-dimensional look-up table ("3D LUT") to minimize memory consumption for converting image data from a first format to a second format. In this aspect, the system includes a 3D LUT splicer configured to splice an initial 3D LUT into eight sub-cube vertices that are stored on eight respective random access memories ("RAMs"), wherein the initial 3D LUT comprises red, green and blue ("RGB") color components for converting the image data to the second format; a pixel input configured to receive at least one pixel in the first format comprising a plurality of upper bits and a plurality of lower bits for each of the RGB color components of the received at least one pixel; and an index value identifier configured to identify the eight sub-cube vertices corresponding to the received at least one pixel based on a set of index values of the plurality of upper bits for the RGB color components of the received at least one pixel. Moreover, the system further includes a plurality of normalized address calculators configured to determine memory access addresses for accessing respective RGB color components to convert the image data to the second format based on each of the identified eight sub-cube vertices of the received at least one pixel; an image data output configured to access the respective RGB color components in the eight respective RAMs based on the determined memory access addresses; and a tri-linear interpolator configured to output converted image data of the at least one pixel in the second format by tri-interpolating the accessed RGB color components of the at least one pixel based on the plurality of lower bits for each of the RGB color components of the received at least one pixel.

In a refinement of the exemplary aspect, the index value identifier is configured to identify the eight sub-cube vertices based on the set of index values for the RGB color components by determining a first sub-cube vertex corresponding to an origin of a sub-cube in the initial 3D LUT and determining a remaining seven sub-cube vertices by applying the origin to a lookup table. Moreover, in one aspect, the lookup table identifies each of the respective eight RAMs that corresponds to a different sub-cube vertex of the eight sub-cube vertices for the at least one pixel.

In another refinement of the exemplary aspect, the system includes a user input configured to receive an instruction for converting the image data from the first format to the second format; and a 3D LUT selector configured to select and load the initial 3D LUT based on the received instruction. As an example, the first format is a standard dynamic range application and the second format is a high dynamic range application.

In another refinement of the exemplary aspect, the 3D LUT splicer is configured to splice the initial 3D LUT by separating each of the RGB axes into alternating vertex values and to store the alternating vertex values in the eight respective RAMs.

In a further exemplary aspect, a system is provided for mapped splicing of a three-dimensional look-up table ("3D LUT") to minimize memory consumption for converting image data. In this aspect, the system includes a 3D LUT splicer configured to splice an initial 3D LUT into a plurality of sub-cube vertices that are stored on a plurality of separate electronic memories, respectively, wherein the initial 3D LUT comprises red, green and blue ("RGB") color components for converting the image data; an index value identifier configured to identify the plurality of sub-cube vertices corresponding to at least one pixel to be converted based on a set of index values for the RGB color components of the at least one pixel; a plurality of address translators configured to determine memory access addresses for accessing respective RGB color components to convert the at least one pixel based on each of the identified plurality of sub-cube vertices of the at least one pixel; and an image data output configured to access the respective RGB color components in the plurality of separate electronic memories based on the determined memory access addresses and convert the accessed RGB color components to image data configured to be displayed on a content consuming device in a converted image format.

In yet another exemplary aspect, a system is provided for mapped splicing of a three-dimensional look-up table ("3D LUT") to minimize memory consumption for converting image data to for display on a content consuming device. In this aspect, the system includes a 3D LUT splicer configured to splice a 3D LUT into a plurality of sub-cube vertices that are stored on a plurality of separate electronic memories, respectively, wherein the 3D LUT comprises a plurality of color components for converting the image data to be displayed on the content consuming device; an index value identifier configured to identify the plurality of sub-cube vertices for at least one pixel to be converted based on a set of index values for the plurality of color components of the at least one pixel; and an image data output configured to access the respective color components in the plurality of separate electronic memories based on the identified plurality of sub-cube vertices and convert the accessed color components to image data configured to be displayed on the content consuming device in a converted image format.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The disclosed system and method will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. For example, splicing of the initial 3D LUT will be executed on the system's hardware as will become readily apparent from the description provided below.

By way of example, an element, or any portion of an element, or any combination of elements may be implemented as a "processing system" that includes one or more microprocessors. For example, one or more of the components of system 100, and, in particular, imaging format converter 120, described below may provide for such processing system. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Figure 1:
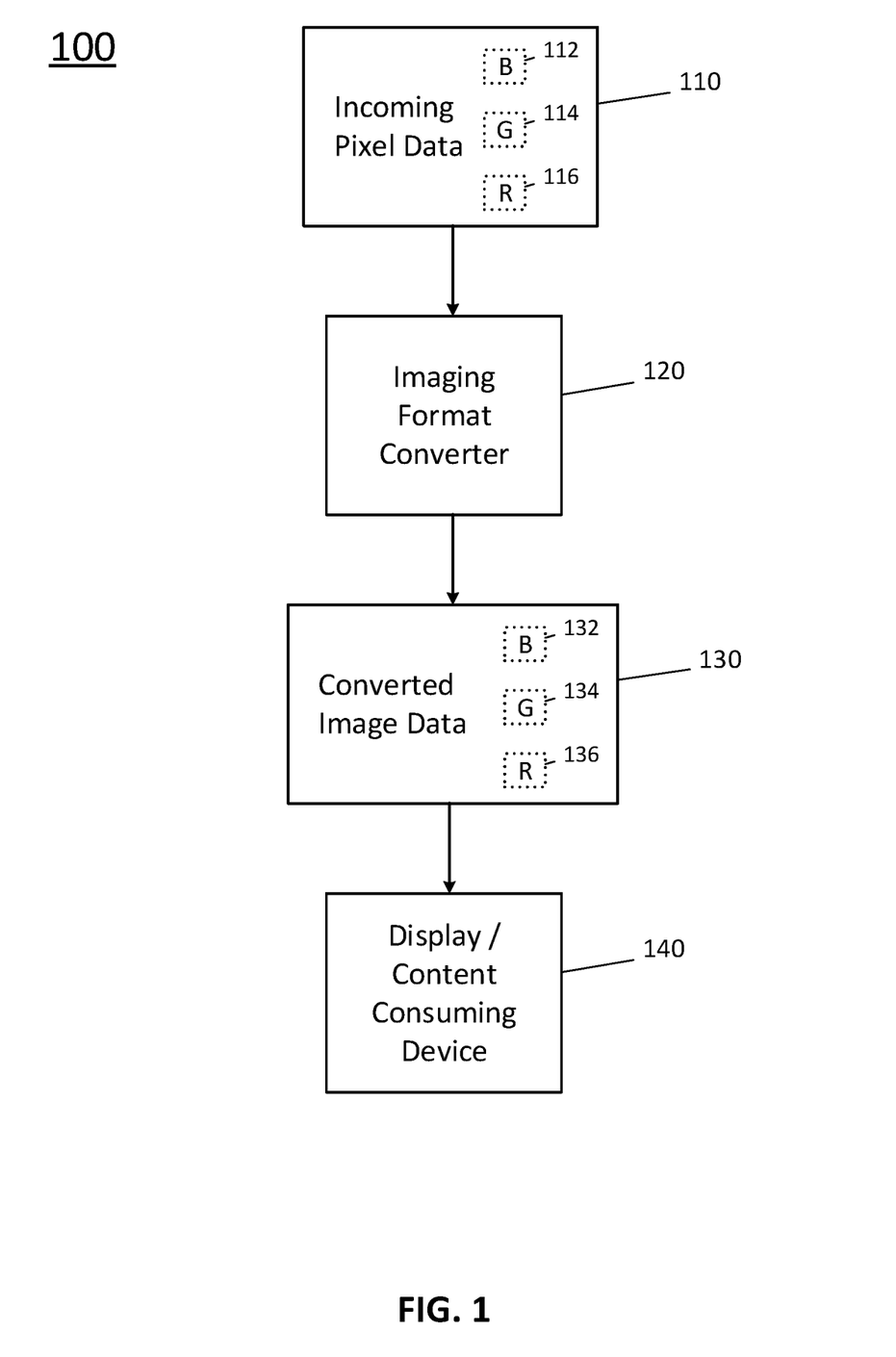
FIG. 1 illustrates a high level block diagram of a system for image format conversion of incoming pixel data according to an exemplary aspect.

FIG. 1 illustrates a high level block diagram of a system for image format conversion of incoming pixel data according to an exemplary aspect. In general, the system 100 is configured to efficiently map a three-dimensional lookup table ("3D LUT") for high dynamic range ("HDR")/standard dynamic range ("SDR")/color space conversion applications and the like within a Field Programmable Gate Array ("FPGA") or similar type of Application-Specific Integrated Circuit ("ASIC") technology.

As shown, the system 100 includes imaging format converter 120 that is configured to receive incoming pixel data 110 and convert the data between two imaging formats (e.g., color space and/or dynamic range models) utilizing the exemplary algorithms disclosed herein. According to the exemplary aspect, the incoming pixel data 110 includes BGR (blue 112, green 114, red 116) components in which each color component of each pixel may be formed by a plurality of bits, for example, each color component being a 10-bit value with bits 9 down to 0. As described in more detail below, the first five bits (i.e., bits 9 to 5) are classified as the upper bits and the second five bits (i.e., bits 4 to 0) are classified as the lower bits for the conversion process. Moreover, it should be appreciated that the incoming pixel data 110 can be generated by a camera, such as a video camera during live video production, that is configured to capture the image/pixel data of the video in a first format and transmit or transfer the captured pixel data as the incoming pixel data 110 to the imaging format converter 120. Alternatively or in addition thereto, the incoming pixel data 110 may be received as part of a data stream transmitted over a network (e.g., the Internet or a WiFi network) as would be appreciated to one skilled in the art. The generating of the pixel data 110 is not critical to the exemplary aspects of the current disclosure, but it should be appreciated that the pixel data is received in a first color space format having the RGB components according to the exemplary aspect.

As will also be described in detail below, the imaging format converter 120 is configured to generate (or otherwise access/load) a 3D LUT that is generated by a software program in the form of, but not limited to, a .cube file, for example, and is loaded within an FPGA and accessed at the video pixel rate. In this exemplary aspect, the imaging format converter 120 is configured to splice the initial 3D LUT into a plurality of smaller LUTs, and, in the exemplary aspect, 8 smaller LUTs that can each be stored within a corresponding RAM (i.e., RAMs "A" to "H"). By splicing the initial 3D LUT, the disclosed system and method can ensure that all 8 vertices of each sub-cube are stored in a different RAM within the FPGA. Moreover, upon receiving the incoming pixel data 110, the imaging format converter 120 is further configured to determine which of the 8 RAMs contains the data corresponding to a given index value. As will also be described below, the imaging format converter 120 is configured to apply an address identification algorithm to determine the exact location within each RAM to access the look-up data for the imaging format conversion that corresponds to a given index value.

As further shown in FIG. 1, the imaging format converter 120 is configured to output converted image data 130 for each incoming pixel data 110 after conversion using the exemplary conversion techniques/algorithms described herein. Similar to the incoming pixel data 110, the converted image data 130 will include BGR components (blue 132, green 134, red 136). Thus, the converted image data 130 may be output in a second imaging format (e.g., HDR format) where it is transmitted to a display device 140 for display thereon. It should be appreciated that the display device 140 can be any type of display device (e.g., television, computer monitor, video production equipment, viewfinder or the like) for consuming content in the second imaging format and is in no way limited, except that the display (content consuming) device 140 is configured to display the converted image data 130 in the converted image format, such as HDR content, for example.

It should also be appreciated that the imaging format conversion can be provided for multiple types of imaging format conversion. For example, the imaging format converter 120 can be configured to change video colorspace, HDR, gain, hue, and the like, or any combination of these functions. Moreover, the imaging format converter 120 can also be used, for example, for YCbCr, YUV, YPbPr and the like, as well as for converting RGB incoming pixels to YUV pixels or vice versa. As noted in more detail below, the software generating the 3D LUT values to perform the image formatting conversion will dictate the function for the specific formatting conversion.

Figure 2:
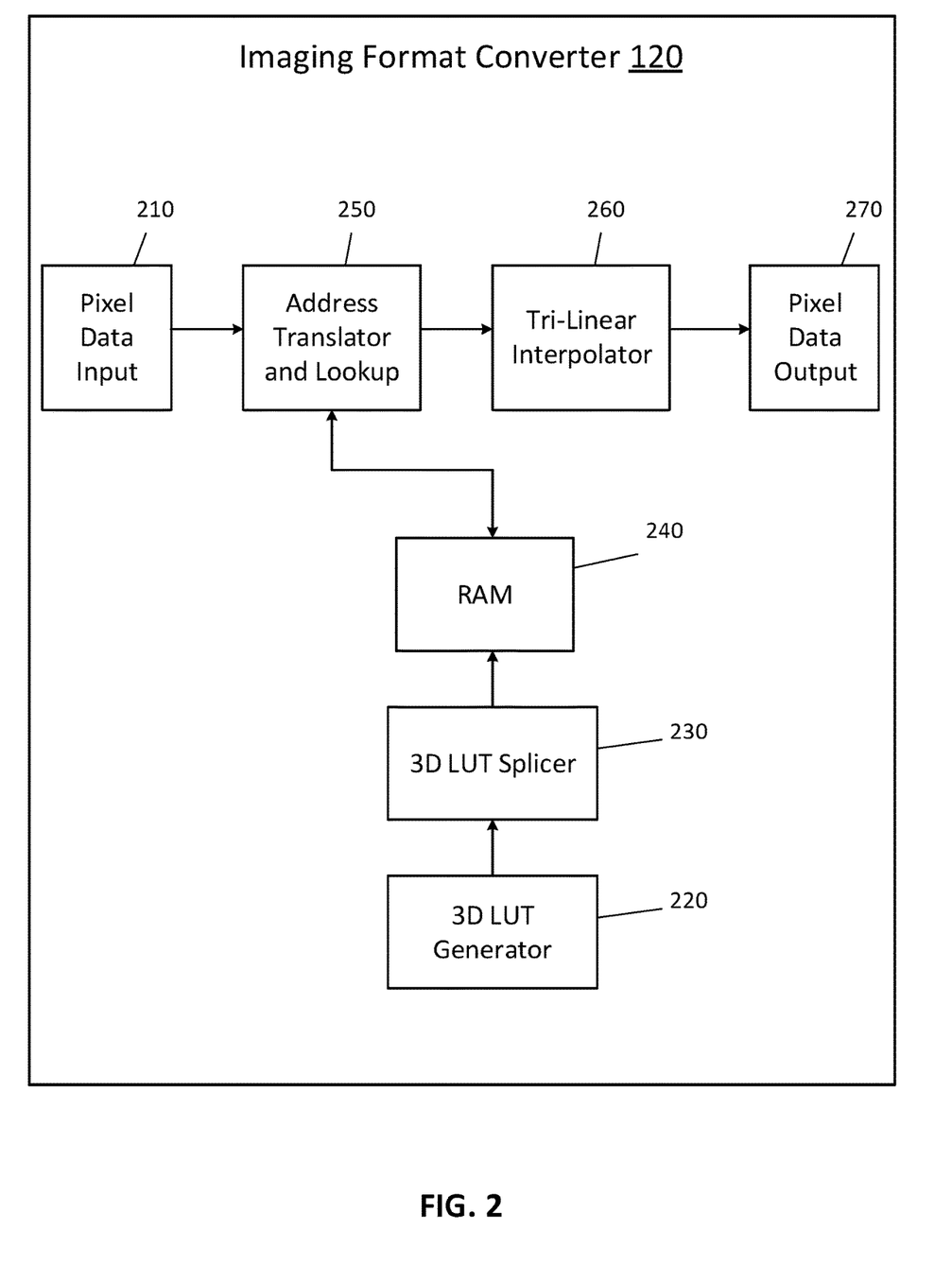
FIG. 2 illustrates a detailed block diagram of the image format converter for converting the format of incoming pixel data according to an exemplary aspect.

FIG. 2 illustrates a detailed block diagram of the imaging format converter for converting the format of incoming pixel data according to an exemplary aspect. In general, the imaging format converter 120 can be implemented as a microcontroller or similar computing device that generally includes one or more CPUs (i.e., processor cores) along with memory (e.g., FPGAs/RAM) and programmable input/output peripherals. In one exemplary aspect, the imaging format converter 120 is configured to execute of software modules configured to perform the algorithms described herein. In general, the term "module" as used herein refers to a software service or application executed on by the one or more CPUs, components, or arrangement of components implemented using hardware, such as by an ASIC or FPGA, for example, or as a combination of hardware and software, such as by a microprocessor system and a set of instructions to implement the module's functionality, which (while being executed) transforms the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown in FIG. 2, the imaging format converter 120 includes a 3D LUT generator 220 that can be a software program that is configured to generate a 3D LUT in the form of, but not limited to, a .cube file that can be loaded an FPGA and accessed at the video pixel rate. In general, 3D LUTs are known to those skilled in the art for color space conversion. For example, 3D LUTs are normally 17×17×17 or 33×33×33 in size as described above. In the case of 33×33×33 LUT, there are 35,937 (i.e., 33 times 33 times 33) locations of RGB data that need to be stored. This data, for example, may be 16-bits of precision, which gives us a total of 33×33×33×16×3 or 1,724,976 bits of information for converting the image data to the second imaging format (e.g., HDR).

In the exemplary aspect, the 3D LUT can be generated by 3D LUT generator 220 or, alternatively, received as LUT downloaded logic. As noted above, the 3D LUT generated/downloaded will be application specific. Thus, a 3D LUT used for an SDR to HDR conversion will be different (i.e., different data) than a 2× gain amplifier, for example. Thus, in one aspect, a user can select a design function (i.e., a designed type of imaging format conversion) and the 3D LUT generator 220 will generate/download the needed 3D LUT for that selected application.

As further shown, a 3D LUT splicer 230 is configured to splice the initial 3D LUT into 8 smaller LUTs that are each stored within a corresponding RAM 240. It is noted that RAM is shown in FIG. 2 as a single component of electronic memory, but is composed of a plurality of separate electronic memories, i.e., a plurality of separate RAMs (i.e., RAM "A" to RAM "H") for the 8 smaller LUTs according to an exemplary aspect. By splicing the initial 3D LUT into smaller LUTs, the 3D LUT splicer 230 can ensure that all 8 sub-cube vertices of the sub-cube are stored in different RAMs. As a result, the disclosed system and method advantageously reduces the required electronic memory for performing an imaging format conversion (e.g., color space conversion), and, therefore, also reduces processing and other resource consumptions during the conversion process, as will become apparent from the disclosure herein.

Figure 3A:
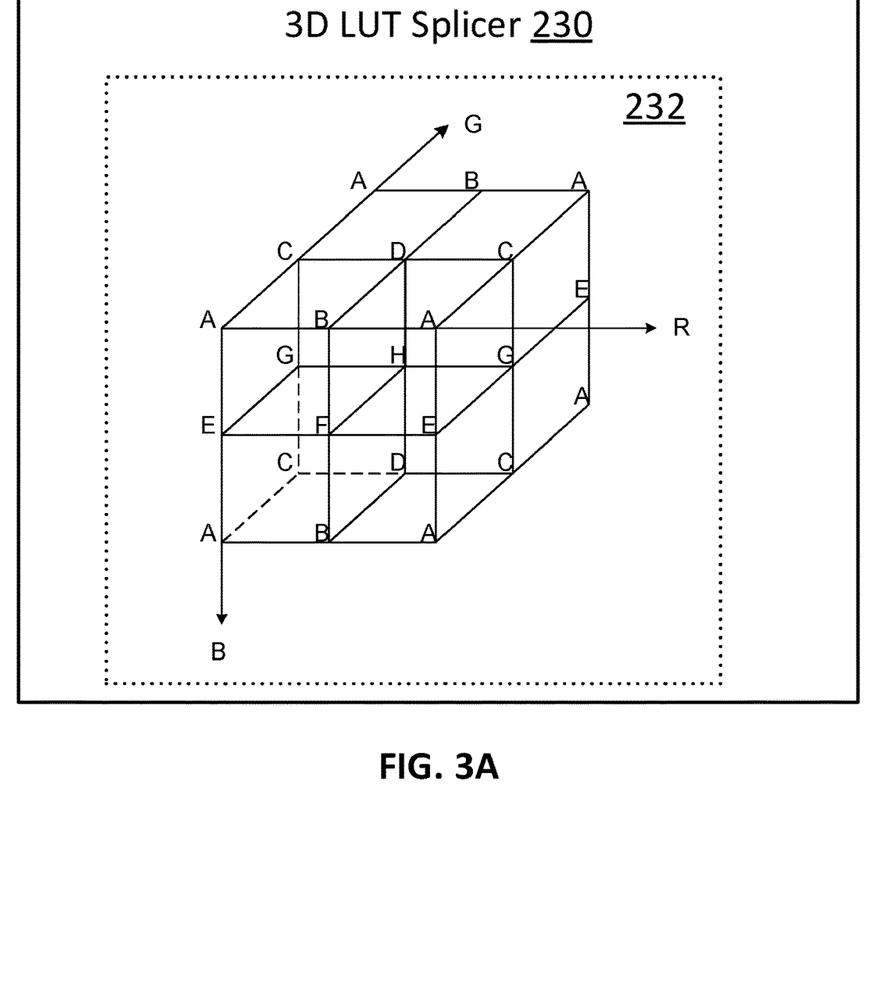
FIG. 3A illustrate the 3D LUT splicer for converting the format of incoming pixel data according to an exemplary aspect.

FIG. 3A illustrate the 3D LUT splicer for converting the format of incoming pixel data according to an exemplary aspect. As shown, the 3D LUT splicer 230 can receive the initial 3D LUT 232 and splice it into 8 smaller LUTs. More particularly, the initial 3D LUT 232 defines the BGR color components and respective data values along the Z,Y,X axes (i.e., the G, B, R axes), respectively. It is noted that the exemplary 3D LUT 232 is illustrated as a 3×3×3 LUT with data value 0,0,0 representing by a first "A" value, data value 0,0,1 representing by a first "B" value, data value 0,0,2 representing by a second "A" value, and so forth. In practice, the 3D LUT will be 33×33×33 in the exemplary aspect as described above and 3D LUT 232 is shown as a 3×3×3 LUT for clarity purposes.

According to the exemplary aspect, the 3D LUT splicer is configured to splice the initial 3D LUT 232 by separating each of the RGB axes into alternating vertex values and to store the alternating vertex values in the eight respective RAMS. As shown, the 3D LUT splicer is configured to splice the initial 3D LUT 232, such that the first row (in the "X" axis) is divided into alternating "A" and "B" values, the second row (in the "X" axis) is divided into alternating "E" and "F" values and so forth. That is, the 3D LUT splicer 230 is identifying and splicing the data in this alternating manner in each data axis of the 3D LUT 232. Accordingly in the exemplary aspect, the 33×33×33 values are each assigned to one of the plurality of smaller LUTs, i.e., 8 smaller LUTs, and stored by the 3D LUT splicer 230 into separate electronic memories of RAM 240. That is, all "A" index values from the initial 3D LUT 232 are stored in a first RANI "A", all "B" index values from the initial 3D LUT 232 are stored in a second RANI "B", and so forth. For exemplary purposes, using a 33×33×33 initial 3D LUT, RANI "A" will store 4913 data values, RAMS "B", "C" and "E" will store 4624 data values, RAMS "D", "F" and "G" will store 4352 data values, and RAM "H" will store 4096 data values, for the total of 35,937 data values. It is noted that the designated axes are set according to a system administrator as a design implementation and can be varied by changing the axes of RGB and/or by flipping around the RAMs "A" to "H". Moreover, while the exemplary aspect splices the initial 3D LUT into 8 sub-cubes, the initial 3D LUT can be spliced into additional sub-cubes according to an alternative aspect.

Figure 3B:
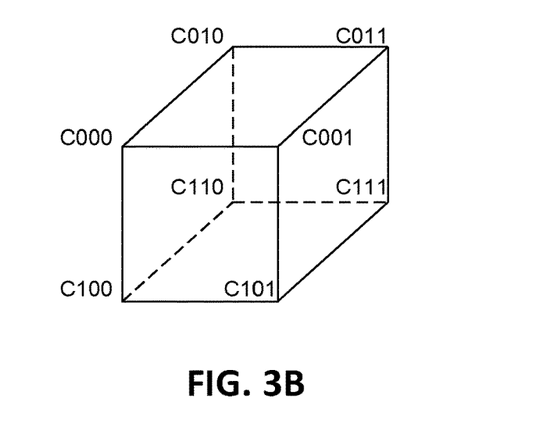
FIG. 3B illustrate an orientation of a sub-cube according to an exemplary aspect.

For illustrative purposes, FIG. 3B shows an orientation of a sub-cube according to an exemplary aspect. As will be described below, upon receiving an initial BGR pixel value, the imaging format converter 120 is configured to identify the correct sub-cube storing the data values for the conversion of this received pixel value. As shown, in the exemplary aspect, the sub-cub is formed from 8 vertices C(0,0,0) to C(1,1,1) and using this orientation, the correct sub-cube in the 3D LUT is identified, such that the incoming pixel always represents C(0,0,0).

Referring back to FIG. 2, the imaging format converter 120 includes a pixel data input 210 configured to receive the incoming BGR pixel data (e.g., incoming pixel data 110) for format version. As noted above, each incoming pixel data can be composed of, for example, the BGR color component that are each a 10-bit value with bits 9 down to 0, with the first five bits (i.e., bits 9 to 5) being the upper bits and the second five bits (i.e., buts 4 to 0) being the lower bits. Thus, each incoming RGB pixel is composed of 10-bits per component, but is also only 1 of 8 LUT addresses defining the location of a sub-cube whose vertex data shall be used to interpolate a newly mapped RGB value for the format conversion. The exemplary imaging format converter 120 takes into account that the 8 LUT addresses that are used to read the vertices are all different with never two of these values being the same for a given input RGB pixel. As a result, the 3D LUT splicer 230 is configured to create the smaller LUTs that each contain the data for 1 of 8 vertices (i.e., vertices A to H) on the sub-cube, where the smaller LUTs are each stored on a separate RAM "A" through "H".

According to the exemplary aspect, when incoming pixel data is received by pixel data input 210, it is passed to address translator and lookup 250, which is coupled to and/or can include RAM 240. Upon receiving the incoming BGR pixel data, the address translator and lookup 250 is first configured to identify the correct sub-cube containing the data required for the imaging format conversion process. That is, in general, the derived sub-cube may have a given vertex from a different RAM for different pixels. According to the exemplary aspect, there are 8 combinations of potential sub-cube structures. In this aspect, the address translator and lookup 250 is configured to identify the correct sub-cube based on index values derived from the upper bits of the received BGR pixel value.

Figure 4:
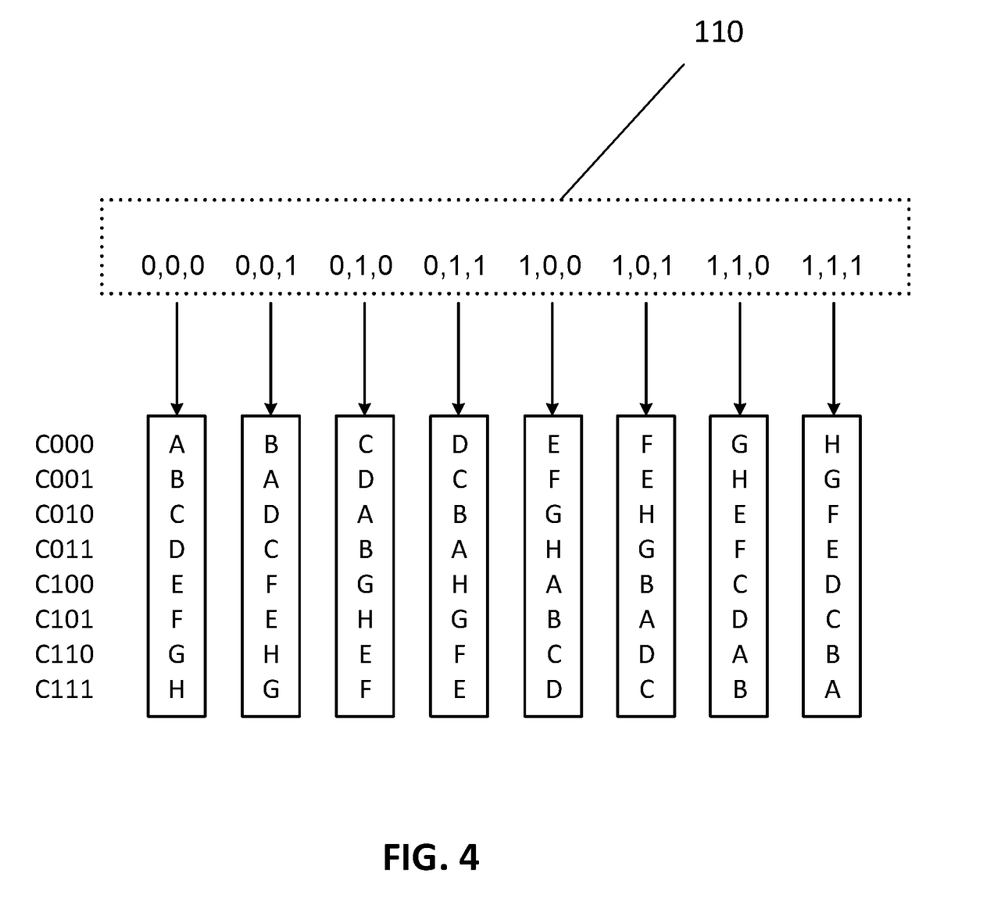
FIG. 4, illustrates detectable sub-cube structures according to an exemplary aspect.

FIG. 4, illustrates detectable sub-cube structures according to an exemplary aspect. As noted above, in order for the 3D LUT to properly function, the incoming pixel data must represent C000 as its origin at all times. However, as also described above, the RAM containing the data for this vertex may be 1 of 8 smaller LUTs (i.e., the data for C000 for a given pixel can be in any one of the RAMs "A" to "H"). In the exemplary aspect, the address translator and lookup 250 is configured to determine the correct index value for C000 (i.e., the origin of the sub-cube within the initial 3D LUT) based on the upper bits of the incoming pixel data and derive the other index values that will be represented by C001 through to C111. FIG. 4 illustrates the detectable sub-cubes for each incoming value (0,0,0) to (1,1,1). Moreover, in an exemplary aspect, for a 33×33×33 3D LUT, bits B(5), G(5), and R(5) are the least significant bit (LSB) of the 5-bit vertex indices. Thus, these bits are used by the address translator and lookup 250 to determine the correct sub-cube combination based on the truth table shown in FIG. 4. Thus, in general, the address translator and lookup 250 is configured to identify the upper 5 bits of the incoming pixel value and use these values to generate lookup data.

Referring to the exemplary truth table, if the received decimal values are 0, 0, 0 (B, G, R), the first sub-cube table (left most) is identified (i.e., the value for C000 is stored in RAM "A") and, therefore, the values of C000 through to C111 are stored in RAMs "A" through to "H", respectively, with C000 being identified as the origin and the remaining sub-cube vertices C001 to C111 being derived based on the origin being applied to the lookup table (i.e., the truth table of FIG. 4). In another example, if the incoming pixel value is comprised of decimal values 0, 0, 1 (B, G, R), the address translator and lookup 250 shall generate lookup data for C000 through to C111 from the second sub-cube, i.e., RAMs B, A, D, C, F, E, H, and G, respectively, such that RAM "B" is identified for C000 and so forth as shown. Thus, in the exemplary aspect, the address translator and lookup 250 is configured to identify the correct sub-cube combination (i.e., for vertices C000 to C111) and corresponding separate electronic memories (i.e., RAMs "A" to "H") based on the bits B(5), G(5), and R(5) as the least significant bit (LSB) of the 5-bit vertex indices (assuming a 33×33×33 3D LUT).

Figure 5:
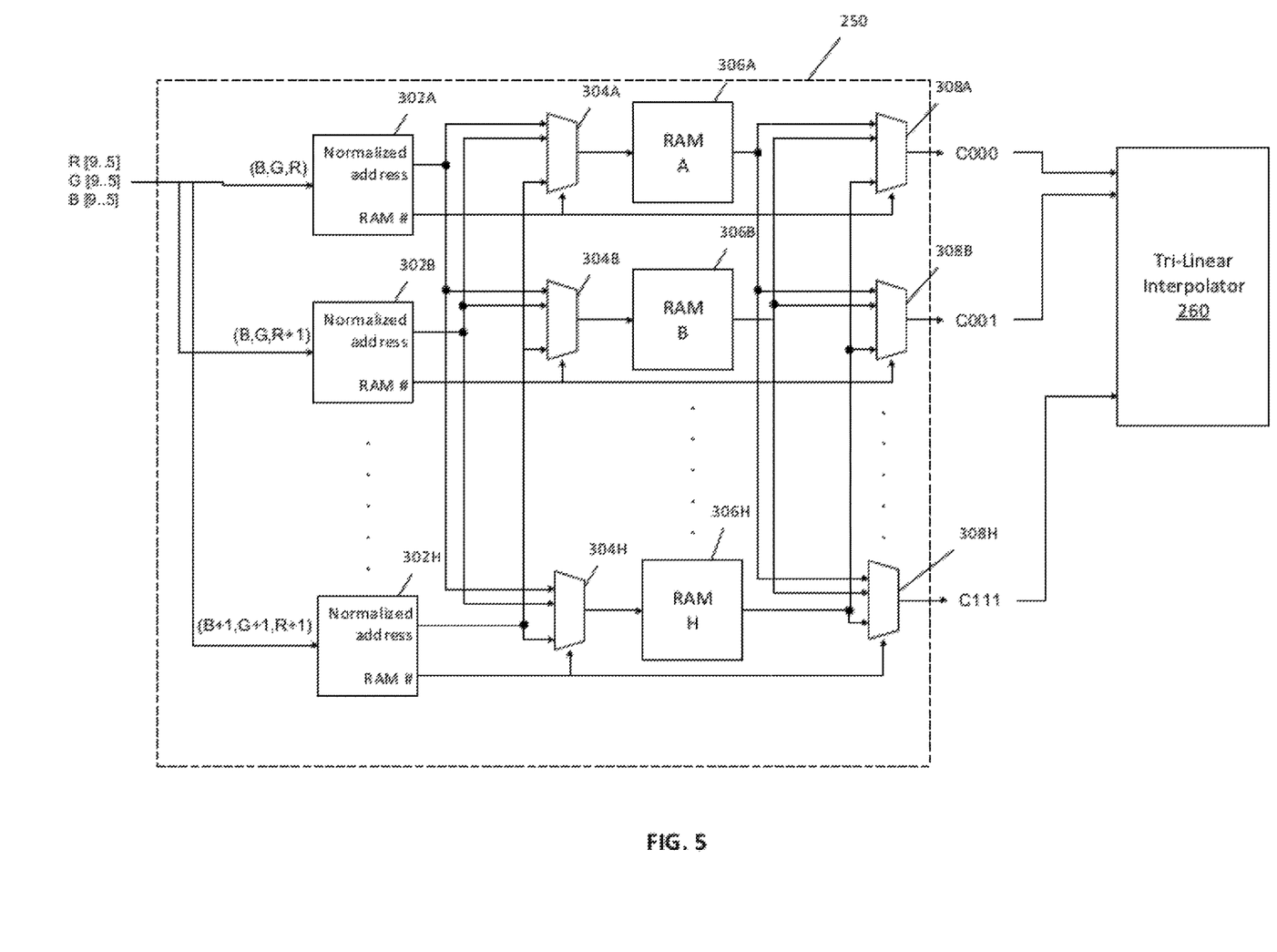
FIG. 5 illustrates a detailed block diagram of the address translator and lookup according to an exemplary aspect.

Referring to FIG. 5, a detailed block diagram of the address translator and lookup is illustrated according to an exemplary aspect. As generally shown, the address translator and lookup 250 receives the upper five bits of the BGR components (i.e., R [9 . . . 5], G [9 . . . 5], and B [9 . . . 5]) and outputs data values C(0,0,0) to C(1,1,1) for the imaging format conversion. In general, it is noted that only three of the eight logic rows of the address translator and lookup 250 are illustrated for clarity purposes. For example, only RAMs "A", "B" and "H" are shown, but it should be appreciated that the address translator and lookup 250 is implemented with all eight RAMs "A" to "H" and that RAMs "C" to "G" are not shown only for clarity of the illustration.

As further shown, the address translator and lookup 250 includes a plurality of normalized address calculators 302A to 302H (i.e., 302C to 302G are not shown) (also referred to as "address translators"), which can be implemented in hardware, software or a combination thereof, and are configured to normalize the lookup address for each RAM "A" through "H". In general, each of the normalized address calculators 302A to 302H is configured to apply a unique address location algorithm (identified below) to each RAM to determine the exact location (e.g., a memory access address) within the RAM the look-up and access data (i.e., RGB color components) corresponding to a given index value in order to convert the image data from the first format to the second format. As a result, the normalized address calculators 302A to 302H are configured to ensure that each applied index value used to look-up a data value from a given RAM is linear or "normalized". That is, when each value from the spliced 3D LUT is stored in a respective RAM, the data values are stored such that there are preferably no gaps in the given RAM memory in order to preserve a contiguous space of memory within each RAM, and, therefore minimize total memory requirements by the address translator and lookup 250. This result is critical in order to prevent the generation of 8 RAMs each with a size of 35,937 locations, which would void the benefit of splicing a large LUT into smaller LUTs.

Thus, referring back to FIG. 3A, an incoming pixel value whose upper 5 bits are 0, 0, 0 (B, G, R) will be stored in the first location of RAM A, i.e., at address 0 of RAM A. Moreover, an incoming pixel value whose upper 5 bits are 0, 0, 2 (B, G, R) shall also be stored in RAM A, but at a second location, i.e., address 1. Likewise, an incoming value of 0, 0, 4 (B, G, R) shall also be stored in RAM A, but at a third location at address 2, for example. By doing so, the RAM "A" effectively stores the data values in contiguous space at addresses 0, 1, 2, and so forth to minimize memory usage. However, since the data value 0, 0, 2 will correspond to address 1 in RAM "A", the normalized address calculators 302A to 302H are configured to ensure that each applied index value used to look-up a data value from a given RAM is linear or "normalized".

Thus, according to an exemplary aspect, in order to locate and access the correct RAM address in each RAM for all 8 vertex indices, the plurality of normalized address calculators 302A to 302H are configured to execute the following memory address location calculations:

S=33 for 33×33×33 3D LUT,
B=Most significant 5 bits of index B,
G=Most significant 5 bits of index G,
R=Most significant 5 bits of index R,
RAM A Normalized address=$B/2*((S+1)/2)^2+G/2*((S+1)/2)+R/2$, RAM B Normalized address=B/2*(S−1)/2*(S+1)/2+G/2*(S−1)/2+(R−1)/2, RAM C Normalized address=B/2*((S−1)/2)*((S+1)/2)+(G−1)/2*((S+1)/2)+R/2), RAM D Normalized address=B/2*(S−1)/2*(S−1)/2+(G−1)/2*(S−1)/2+(R−1)/2, RAM E Normalized address=(B−1)/2*((S+1)/2)^2+G/2*((S+1)/2)+R/2), RAM F Normalized address=(B−1)/2*(S−1)/2*(S+1)/2+G/2*(S−1)/2+(R−½), RAM G Normalized address=(B−1)/2*((S−1)/2)*((S+1)/2)+(G−1)/2*((S+1)/2)+R/2), RAM H Normalized address=(B−1)/2*(S−1)/2*(S−1)/2+(G−1)/2*(S−1)/2+(R−½)

Referring back to FIG. 5, each calculated normalized address is fed to a plurality of first 8×1 multiplexers 304A to 304H (i.e., 304C to 304G are not shown). Moreover, from these eight normalized addresses input to each of the plurality of multiplexers 304A to 304H, one of the 8 values is selected by a respective control signal to select the correct normalized address (i.e., the correctly applied index number) to identify the corresponding data value in the respective RAM connected thereto.

As further shown, the control signal for each of the plurality of 8×1 multiplexers 304A to 304H is fed from the plurality of normalized address calculators 302A to 302H as a separate RAM number, which is based on the identified sub-cube as discussed above. In other words, if the incoming pixel is comprised of decimal values 0, 0, 1 (B, G, R) using the example above, the address translator and lookup 250 generates lookup data for C000 through to C111 from RAMs B, A, D, C, F, E, H, and G, respectively, such that RAM "B" is identified for C000 and so forth. Thus, in the exemplary aspect, the RAM # s output as the control signals for this data value will be 2 ("B"), 1 ("A"), 4 ("D"), 3 ("C"), 6 ("F"), 5 ("E"), 8 ("H") and 7 ("G"), which correspond to input select signals of the particular multiplexer. For example, normalized address calculators 302A will output as the "RAM #" a control signal of "2" (since C000 is identified in RAM "B" according to the identified sub-cube) instructing multiplexer 304A to use the second input, which is coupled to the output of normalized address calculators 302B. This is because the incoming value is 0, 0, 1 (B, G, R) and as shown, the input to normalized address calculators 302B is (B, G, R+1), which equals (0, 0, 2). As noted above, this address in the 3D LUT corresponds to a "A" value. Thus, multiplexer 304A is controlled in this example to select the second input which is the normalized address for the data in RAM "A" 306A. As noted above, each vertex is different for a given sub-cube, and, therefore, the control signals applied to each of the plurality of 8×1 multiplexers 304A to 304H will be different and based on a different one of the RAMs "A" to "H". In addition, it should be appreciated that the address location calculation is performed in parallel for each of the 8 smaller 3D LUTs (i.e., RAMs "A" to "H") thereby minimizing processing time.

As further shown, the address translator and lookup 250 also includes a plurality of second 8×1 multiplexers 308A to 308H (i.e., 308C to 308G are not shown). In this aspect, the output of each of the 8 RAMs "A" to "H" is also fed to inputs of each of the eight multiplexers 308A to 308H. Thus, once the output data is identified in each RAM based on the calculated normalized address, it is fed to the eight multiplexers 308A to 308H. As further shown, the control signal output from each of the plurality of normalized address calculators 302A to 302H is also used as the control signal for the eight multiplexers 308A to 308H. Thus, referring again to the example in which the incoming pixel is comprised of decimal values 0, 0, 1 (B, G, R), the control signal output from normalized address calculator 302A (i.e., "RAM #") will be a control signal "2", for example. Thus, as shown, this control signal is fed to multiplexer 308A, which is instructed to select the second input thereto, which is coupled to the output of RAM "B" 206B. It is reiterated that only three inputs of each multiplexer are shown, but that the multiplexers are contemplated as having 8 inputs according to the exemplary aspect.

Moreover, as also shown, the output of multiplexer 308A represents the value C000. It should be appreciated that since the incoming pixel is comprised of decimal values 0, 0, 1 (B, G, R), the data value from the smaller LUT of RAM "B" is identified for value C000 of this incoming pixel. Therefore, since the control signal fed to multiplexer 308A is a control signal "2", it is selecting the second input of the multiplexer 308A that is coupled to the output of RAM "B". Thus, the output of multiplexer 308A provides the correct value for C000 for the incoming pixel having the decimal values 0, 0, 1 (B, G, R).

Finally, it should be appreciated that the same data value access process is executed for each value of C000 to C111 from each RAM "A" to "H" based on the configuration of the address translator and lookup 250 as discussed above. Each of these values are then fed to a tri-linear interpolator 260 before the final pixel output data (i.e., the converted image data 130) is output as pixel data output 270, and then subsequently transmitted to an end consuming device to display the reformatted content.

Figure 6:
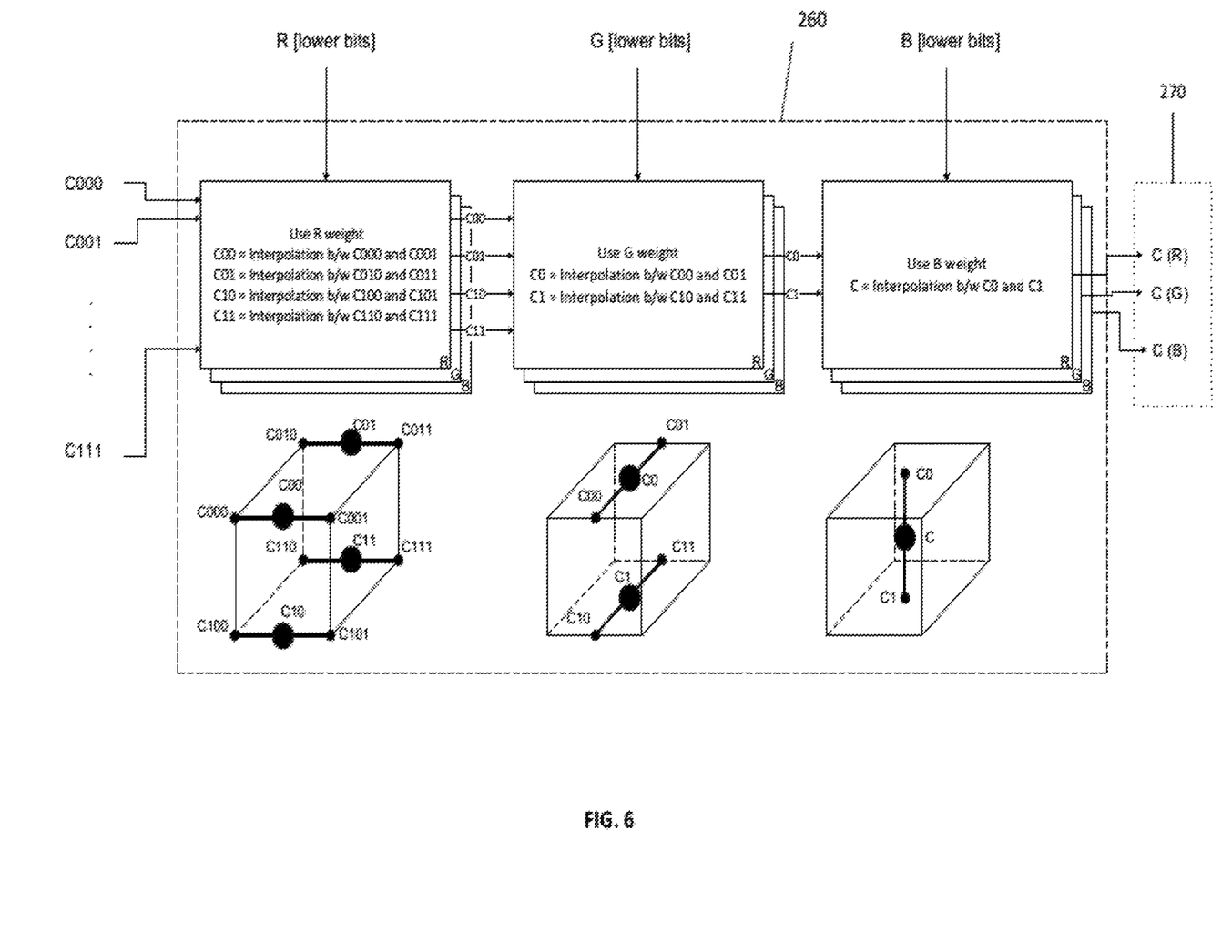
FIG. 6 illustrates an exemplary configuration of the tri-linear interpolator according to an exemplary aspect.

FIG. 6 illustrates an exemplary configuration of the tri-linear interpolator 260 according to an exemplary aspect. In general, trilinear interpolation is known to those skilled in the art as a multivariate interpolation on a 3-dimensional regular grid that approximates a value of an intermediate point within the local axial rectangular prism linearly, using data on the lattice points. It is noted that any specific configuration for the tri-linear interpolator 260 can be implemented and that the particular details are not important to the aspects of the imaging format conversion system and process disclosed herein. Thus, tri-linear interpolator 260 is only briefly described as follows for exemplary purposes.

As shown, each of the values C000 to C111 that are identified by the address translator and lookup 250 are fed as inputs to tri-linear interpolator 260. It should be appreciated that the values of C000 to C111 are calculated using the techniques described above and provided for each of the R, G, and B color components. Moreover, as further shown, the lower bits 4 to 0 from each color component of the incoming pixel are fed as R lower bits, G lower bits and B lower bits to the tri-linear interpolator 260. Thus, in a first stage, an R weighting value based on the R lower bits is used to perform an interpolation between pairs of the vertices. In other words, by applying this weight, an interpolated value C00 is calculated as an interpolated value between C000 and C001. Similarly, an interpolated value C01 is calculated as an interpolated value between C010 and C011, an interpolated value C10 is calculated as an interpolated value between C100 and C110, and an interpolated value C11 is calculated as an interpolated value between C110 and C111. In the next stage, a G weighting value based on the G lower bits is applied to perform an interpolation of the pairs output from the first stage. That is, an interpolated value C0 is calculated as an interpolated value between C00 and C01 and an interpolated value C1 is calculated as an interpolated value between C10 and C11. Finally, using a B weighting value based on the B lower bits, an interpolation value C is calculated as an interpolated value between C0 and C1. As a result of this process, the tri-linear interpolator 260 is configured to calculate output values C for each of the three color components green, blue and red, which can be transmitted as converted image data 130 (i.e., the calculated "C" values correspond to new B 132, G 134 and R 136 color components) by pixel data output 270. Accordingly, the imaging format converter is effectively configured to output image data in the second imaging format by access the respective color components in the plurality of separate electronic memories (i.e., RAMs: A" to "H") based on the identified plurality of sub-cube vertices (C000 to C111) and convert the accessed color components to image data that is transmitted by pixel data output 270 in a format configured to be displayed on the content consuming device 140 in this converted second image format.

Thus, it should be appreciated that the incoming pixel data 110 (which was received in a first format, such as SDR) can be quickly converted to converted image data 130 (in a second format, such as HDR) using the exemplary system disclosed herein. Accordingly, the disclosed system and method advantageously enables an implementation with an FPGA possessing a limited amount of embedded memory by splicing the 3D LUT as described above. In other words, the exemplary system is configured to simultaneously access 1 large 3D LUT using 8 different indices, which effectively prevents the need for multiple implementations of the same 3D LUT within an FPGA or ASIC. Moreover, the disclosed system provides a more efficient alternative to increasing clock frequency. It should be appreciated that with an increase in clock frequency, multiple data can be accessed at multiple times the pixel rate.

Figure 7:
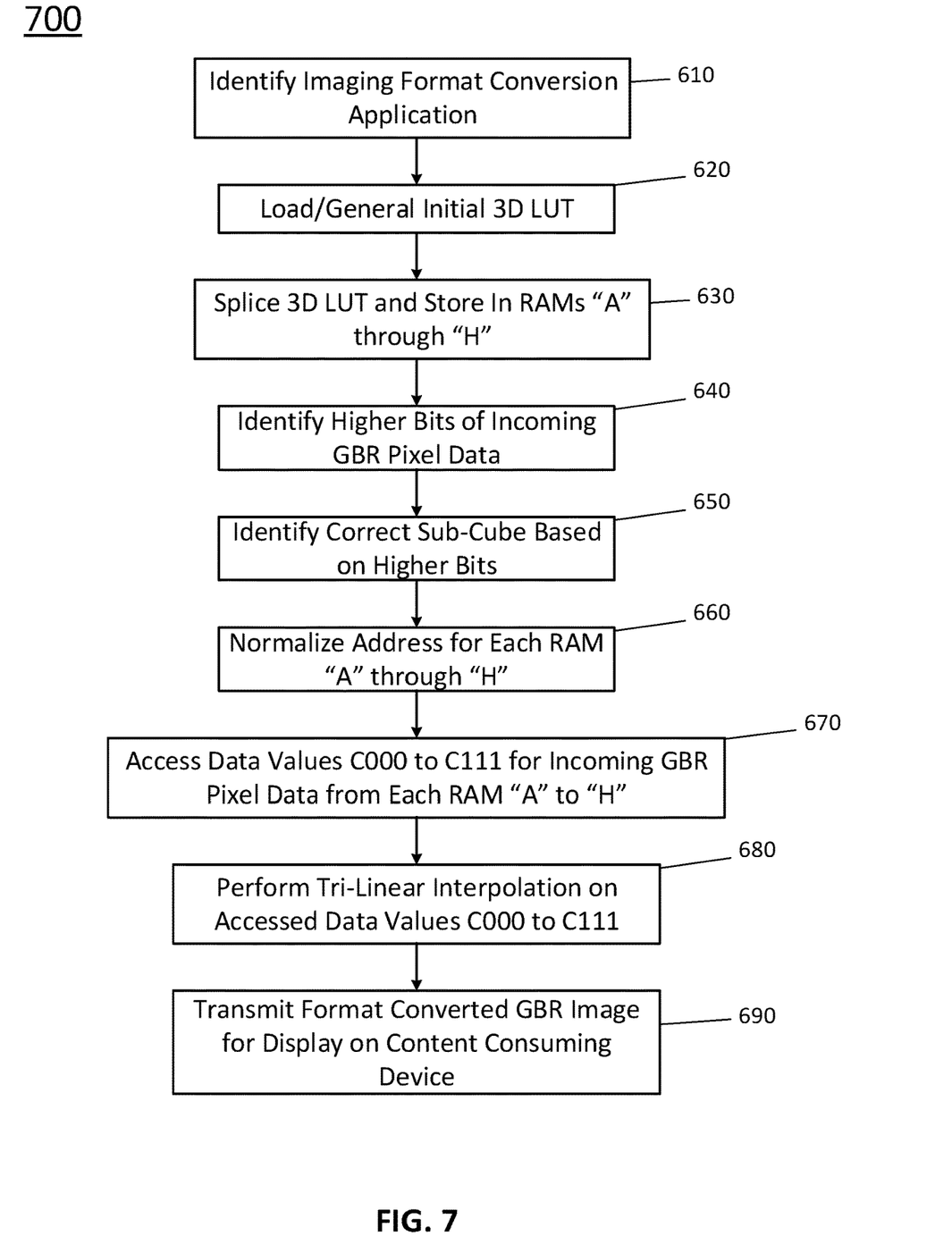
FIG. 7 illustrates a flowchart for a method for image format conversion of incoming pixel data according to an exemplary aspect.

FIG. 7 illustrates a flowchart for a method for image format conversion of incoming pixel data according to an exemplary aspect. As described above, the exemplary process generally involves the load of RAMs "A" through "H" with the required data (i.e., the spliced data from the initial LUT) prior to usage. It should be appreciated that data can be written to the different RAMs "A" to "H" by 3D LUT splicer 230 using the same technique as extracting data from the memory. Moreover, during operation, the upper 5-bits (i.e., the index values) of each component of an incoming GBR pixel are used to determine which of the smaller RAMs "A" through "H" contain the data for this pixel. As described above, bit 0 of each component's 5-bit index value is used to find the correct RAM in the exemplary aspect. After determining the correct RAM, a predetermined algorithm for a given RAM is applied to find the normalized RAM look-up address.

As shown in FIG. 7, an exemplary flowchart 700 is shown for image format conversion according to an exemplary aspect. Initially, at step 610, a particular imaging format is identified, for example, by a user input. For example, the user can control the converting process to perform an image format conversion of video from SDR to HDR, for example. Upon receiving this instruction, the image format converter 120 at step 620 can download and/or generate (e.g., by 3D LUT generator 220) 3D LUT logic that includes data values for the second imaging format (e.g., HDR) based on input color components for each pixel in the first imaging format (e.g., SDR). At step 630, the 3D LUT splicer 230 is configured to splice the loaded 3D LUT and store the spliced data into each of the respective RAMs "A" to "H", which can be part of the address translator and lookup 250 as described above.

Once the data is loaded in to the RAMs of the FPGA, the imaging format converter 120 is configured to perform the conversion from the first to second imaging formats. Thus, at step 640, the address translator and lookup 250 is configured to receive the incoming pixel data and for each data, identify the upper bits of each of the RGB components for each pixel. In an exemplary aspect, the address translator and lookup 250 uses bits B(5), G(5), and R(5), which are the least significant bit (LSB), for the 5-bit vertex indices. At step 650, these values are used to identify the correct sub-cube as discussed by looking up all 8 sub-cube vertices corresponding to the incoming pixel using the lookup tables shown in FIG. 4, for example. The identified sub-cube will provide the control signals for the data access in the RAMs performed by the address translator and lookup 250.

Next, at step 660, a plurality of normalized address calculators 302A to 302H of the address translator and lookup 250 are configured to perform a unique address location algorithm to identify the correct (i.e., "normalized") address within each of the RAMs "A" to "H" for each vertex C000 to C111. These values are then accessed at step 670 by the address translator and lookup 250 before the values are fed to tri-linear interpolator 260 at step 680. After tri-linear interpolation is performed on the values C000 to C111 based on weighting values calculated from the lower five bits of the incoming pixel, the converted value (i.e., value "C") for each color component can be output and transmitted to a content consuming device for display in the second/converted imaging format at step 690. As further described above, steps 640 to 690 can be performed by imaging format converter 120 for each incoming RGB pixel value of the video as described above to the complete the format conversion for the video. As described above, the disclosed method advantageously enables an implementation with an FPGA possessing a limited amount of embedded memory by splicing the 3D LUT, which thereby prevents the need for multiple implementations of the same 3D LUT within an FPGA or ASIC.

As described above, in various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for converting image data for display on a content consuming device, the system comprising:
   a plurality of separate electronic memories configured to store a plurality of sub-cube vertices of a three-dimensional lookup table ("3D LUT"), respectively, wherein the 3D LUT comprises a plurality of color components for converting image data to be displayed on the content consuming device;
   an index value identifier configured to identify the plurality of sub-cube vertices for a pixel to be converted based on a set of index values for the plurality of color components of the pixel by determining a first sub-cube vertex corresponding to an origin of a sub-cube in the 3D LUT and determining remaining sub-cube vertices by applying the origin to a lookup table; and
   an image data output configured to access the respective color components of the pixel based on the identified plurality of sub-cube vertices and to convert the accessed color components to image data configured to be displayed on the content consuming device in a converted image format.

2. The system according to claim 1, further comprising a 3D LUT splicer configured to splice the 3D LUT into the plurality of sub-cube vertices to be stored on the respective plurality of separate electronic memories.

3. The system according to claim 1, wherein the lookup table identifies each of the plurality of separate electronic memories that corresponds to a different sub-cube vertex of the plurality of sub-cube vertices.

4. The system according to claim 1, further comprising:
   a user input configured to receive an instruction for converting the image data from a first format to a second format; and
   a 3D LUT selector configured to select and load the 3D LUT based on the received instruction.

5. The system according to claim 4, wherein the first format is a standard dynamic range application and the second format is a high dynamic range application.

6. The system according to claim 1, further comprising:
   a plurality of address translators configured to determine memory access addresses for accessing the respective color components to convert the pixel based on each of the identified plurality of sub-cube vertices of the pixel;
   wherein the image data output is configured to access the respective color components in the plurality of separate electronic memories based on the determined memory access addresses.

7. The system according to claim 6, wherein the image data output comprises a tri-linear interpolator configured to convert the accessed color components to image data by tri-interpolating the accessed color components of the pixel.

8. The system according to claim 1, further comprising a pixel input configured to receive the pixel in a first format comprising a plurality of upper bits and a plurality of lower bits for each of red, green, and blue color components of the received pixel.

9. A system for converting image data for display on a content consuming device, the system comprising:
   a plurality of separate electronic memories configured to store a plurality of sub-cube vertices of a three-dimensional lookup table ("3D LUT"), respectively, wherein the 3D LUT comprises a plurality of color components for converting image data to be displayed on the content consuming device;
   at least one address translator configured to determine an origin of a sub-cube in the 3D LUT based on incoming pixel data of a pixel and further configured to determine remaining sub-cube vertices of the respective sub-cube by applying the origin as a first sub-cube vertex to a lookup table that identifies a correct combination of the sub-cube vertices for converting the image data; and
   an image data output configured to access the respective color components of the pixel to be converted based on the plurality of sub-cube vertices and to convert the accessed color components to image data in a converted image format that is configured to be displayed on the content consuming device.

10. The system according to claim 9, wherein the at least one address translator identifies the plurality of sub-cube vertices for the pixel based on a set of index values for the plurality of color components of the pixel.

11. The system according to claim 10, further comprising a 3D LUT splicer configured to splice the 3D LUT into the plurality of sub-cube vertices to be stored on the respective plurality of separate electronic memories.

12. The system according to claim 11, wherein the lookup table identifies each of the plurality of separate electronic memories that corresponds to a different sub-cube vertex of the plurality of sub-cube vertices.

13. The system according to claim 9, further comprising:
   a user input configured to receive an instruction for converting the image data from a first format to a second format; and
   a 3D LUT selector configured to select and load the 3D LUT based on the received instruction.

14. The system according to claim 13, wherein the first format is a standard dynamic range application and the second format is a high dynamic range application.

15. The system according to claim 10,
   wherein the at least one address translator comprises a plurality of address translators configured to determine memory access addresses for accessing the respective color components to convert the pixel based on each of the identified plurality of sub-cube vertices of the pixel;
   wherein the image data output is configured to access the respective color components in the plurality of separate electronic memories based on the determined memory access addresses.

16. The system according to claim 15, wherein the image data output comprises a tri-linear interpolator configured to convert the accessed color components to image data by tri-interpolating the accessed color components of the pixel.

17. The system according to claim 9, further comprising a pixel input configured to receive the pixel in a first format comprising a plurality of upper bits and a plurality of lower bits for each of red, green, and blue color components of the received pixel.

18. A system for converting image data for display on a content consuming device, the system comprising:

a plurality of separate electronic memories configured to store a plurality of sub-cube vertices of a three-dimensional lookup table ("3D LUT"), respectively, wherein the 3D LUT comprises a plurality of color components for converting image data to be displayed on the content consuming device;

means for identifying the plurality of sub-cube vertices for a pixel to be converted based on a set of index values for the plurality of color components of the pixel by determining a first sub-cube vertex corresponding to an origin of a sub-cube in the 3D LUT and determining remaining sub-cube vertices by applying the origin to a lookup table;

means for accessing the respective color components of the pixel based on the identified plurality of sub-cube vertices; and means for converting the accessed color components to image data configured to be displayed on the content consuming device in a converted image format.

19. The system according to claim 18, further comprising means for splicing the 3D LUT into the plurality of sub-cube vertices to be stored on the respective plurality of separate electronic memories.

20. The system according to claim 18, wherein the lookup table identifies each of the plurality of separate electronic memories that corresponds to a different sub-cube vertex of the plurality of sub-cube vertices.

21. The system according to claim 18, further comprising:
a user input configured to receive an instruction for converting the image data from a first format to a second format; and
means for selecting and loading the 3D LUT based on the received instruction.

22. The system according to claim 21, wherein the first format is a standard dynamic range application and the second format is a high dynamic range application.

23. The system according to claim 18, further comprising:
means for determining memory access addresses for accessing the respective color components to convert the pixel based on each of the identified plurality of sub-cube vertices of the pixel; and
means for accessing the respective color components in the plurality of separate electronic memories based on the determined memory access addresses.

24. The system according to claim 23, further comprising means for converting the accessed color components to image data by tri-interpolating the accessed color components of the pixel.

25. The system according to claim 18, further comprising means for receiving the pixel in a first format comprising a plurality of upper bits and a plurality of lower bits for each of red, green, and blue color components of the received pixel.

* * * * *